United States Patent
Sipe

(10) Patent No.: US 8,842,877 B2
(45) Date of Patent: Sep. 23, 2014

(54) POSTAL PROCESSING INCLUDING VOICE FEEDBACK

(75) Inventor: Stanley W. Sipe, Mansfield, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 327 days.

(21) Appl. No.: 13/270,344

(22) Filed: Oct. 11, 2011

(65) Prior Publication Data

US 2012/0089403 A1  Apr. 12, 2012

Related U.S. Application Data

(60) Provisional application No. 61/392,077, filed on Oct. 12, 2010.

(51) Int. Cl.
  *G06K 9/00* (2006.01)
  *G10L 15/26* (2006.01)
  *G06K 9/03* (2006.01)

(52) U.S. Cl.
  CPC .............. *G10L 15/265* (2013.01); *G06K 9/033* (2013.01)
  USPC .......................... 382/101; 704/270; 704/275

(58) Field of Classification Search
  USPC ........ 714/45; 365/230.03; 709/216; 719/320, 719/100; 455/440; 379/88.01, 93.05; 707/999.009; 704/270, 275; 209/702, 209/546, 44.4; 382/101
  See application file for complete search history.

(56) References Cited

U.S. PATENT DOCUMENTS

| | | | |
|---|---|---|---|
| 6,394,278 B1* | 5/2002 | Reed | 209/44.4 |
| 6,581,782 B2* | 6/2003 | Reed | 209/702 |
| 8,260,455 B2* | 9/2012 | Redford et al. | 700/230 |
| 2002/0036160 A1* | 3/2002 | Reed | 209/546 |
| 2003/0201212 A1* | 10/2003 | Reed | 209/702 |
| 2008/0273749 A1* | 11/2008 | Rundle et al. | 382/101 |
| 2009/0055233 A1* | 2/2009 | Lamprecht et al. | 705/7 |
| 2009/0089236 A1* | 4/2009 | Lamprecht et al. | 706/46 |
| 2009/0110284 A1* | 4/2009 | Lamprecht et al. | 382/187 |
| 2010/0145504 A1* | 6/2010 | Redford et al. | 700/227 |

FOREIGN PATENT DOCUMENTS

WO  WO 2007135137 A1  11/2007

OTHER PUBLICATIONS

PCT International Search Report mailed Dec. 20, 2011 corresponding to PCT International Application No. PCT/US2011/055918 filed Oct. 12, 2011 (10 pages).

* cited by examiner

*Primary Examiner* — Vijay B Chawan

(57) ABSTRACT

System, methods, and computer-readable media. A method includes receiving a voice input, from an operator, corresponding to a mail item. The method includes performing a voice recognition process on the voice input to produce spoken data, and producing a system result corresponding to the spoken data. The method includes analyzing the system result to produce feedback information, and audibly sounding the feedback information to the operator.

20 Claims, 3 Drawing Sheets

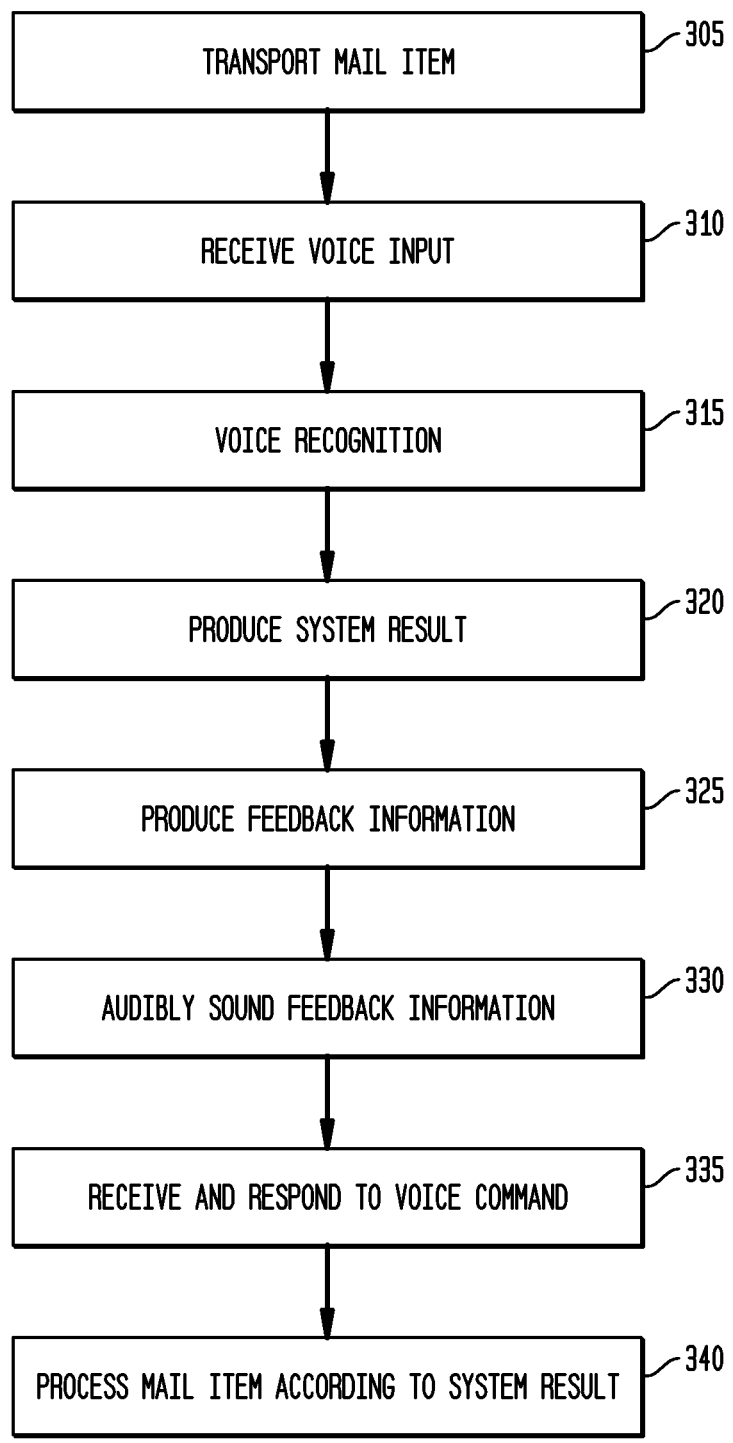

POSTAL PROCESSING INCLUDING VOICE FEEDBACK

CROSS-REFERENCE TO OTHER APPLICATIONS

This application claims the benefit of the filing date of U.S. Provisional Patent Application 61/392,077, filed Oct. 12, 2010, which is hereby incorporated by reference. This application also shares some subject matter with the following U.S. Patent Applications: Provisional Application 61/231,442, filed Aug. 5, 2009, Provisional Application 61/288,902, filed Dec. 22, 2009, patent application Ser. No. 12/967,313, filed Dec. 14, 2010 and now abandoned, and patent application Ser. No. 12/846,957, filed Jul. 30, 2010 and now U.S. Pat. No. 8,380,501, all of which are hereby incorporated by reference.

TECHNICAL FIELD

The present disclosure is directed, in general, to address recognition in postal processing systems.

BACKGROUND OF THE DISCLOSURE

Improved postal processing and other systems are desirable.

SUMMARY OF THE DISCLOSURE

Various disclosed embodiments include a system and method. A method includes receiving a voice input, from an operator, corresponding to a mail item. The method includes performing a voice recognition process on the voice input to produce spoken data, and producing a system result corresponding to the spoken data. The method includes analyzing the system result to produce feedback information, and audibly sounding the feedback information to the operator.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 3 depicts a flowchart of a process in accordance with disclosed embodiments.

DETAILED DESCRIPTION

Figure 1:
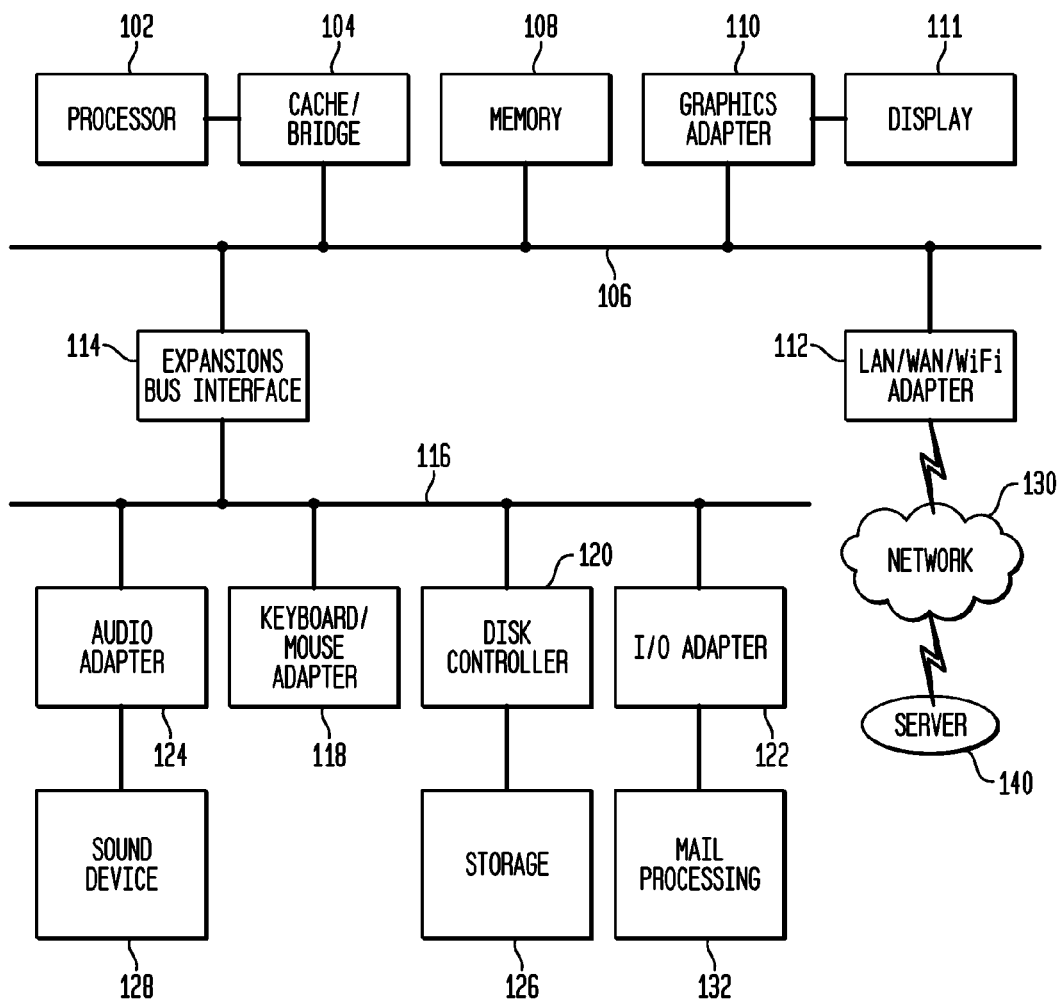
FIG. 1 depicts a block diagram of a data processing system in which an embodiment can be implemented.
Figure 2:
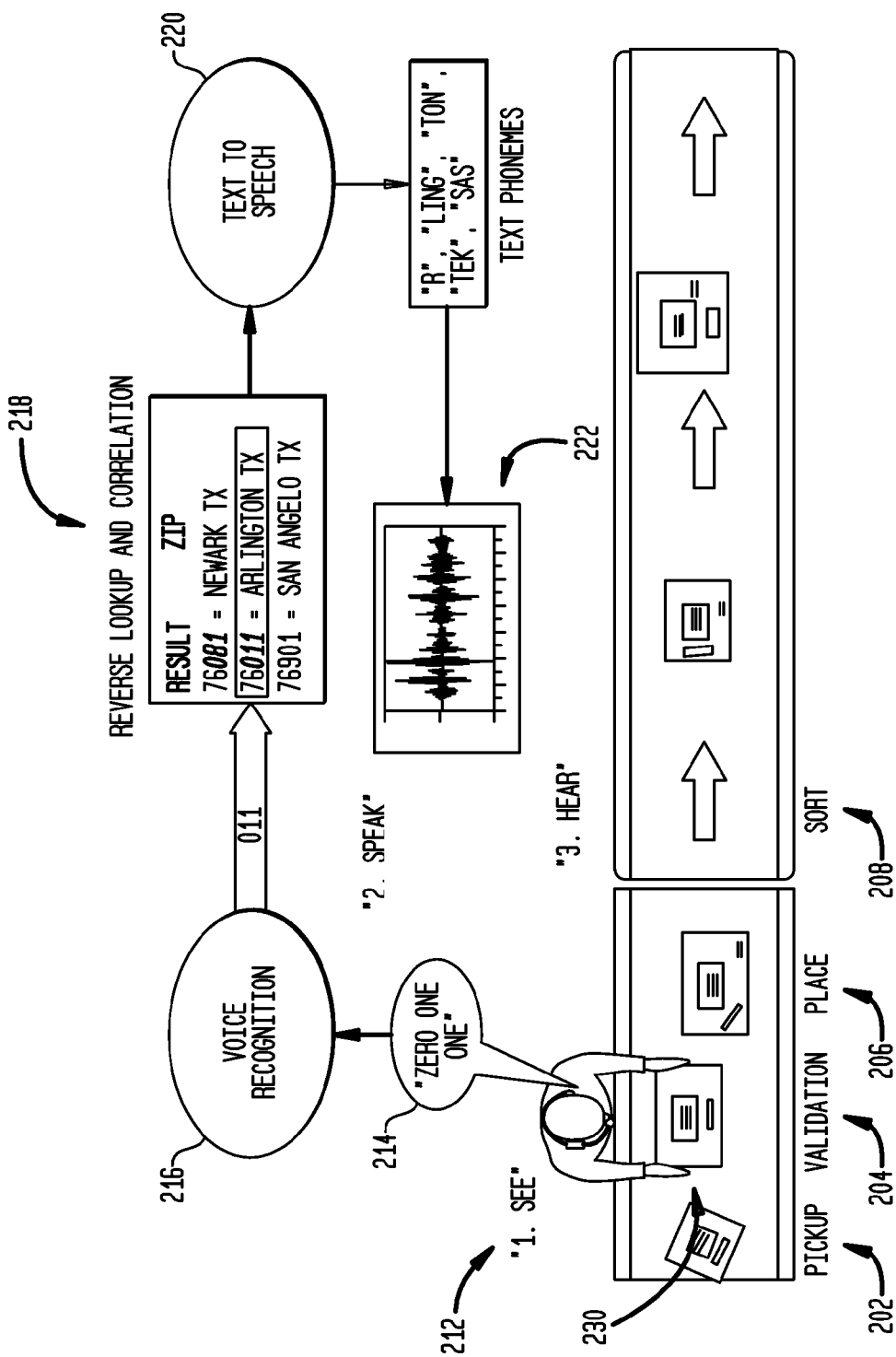
FIG. 2 illustrates an example of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Postal processing facilities around the world currently use manual keying stations to enter destination information for small parcels, bundles, and packages. These systems are very labor intensive because of the use of the operator's hands for package culling and positioning as well as the keying of the mail items. This results in a very low operational throughput per operator.

Optical Character Recognition (OCR) systems have been developed and tested to replace the manual keying stations. However, the read rate of these systems is not optimal and creates operational problems for the facility with a large number of rejects and exception handling processing. Voice recognition can be used as a means to identify data associated with an object such as the destination address of a mail piece like a parcel. This can be a more efficient means than having the operator enter the destination on a keyboard, especially if the operator is facing and placing the object because the operator's hands are free during voicing as opposed to a typing operation that requires at least one hand to enter the data.

Voice recognition and OCR processes can individually result in erroneous results. Disclosed embodiments include systems and methods that to assist the OCR by using speech recognition. The manual keying stations can be replaced with "Hybrid Voice" stations allowing both OCR and speech recognition, using a set of the spoken syntax and token rules syntax, technologies to be used in conjunction with each other.

With this combined technology, it is desirable to have the sorting system's final sorting decision, based upon the operators spoken words, the OCR, and system decision logic, verified before acting upon the actual sorting process. Such a verification process itself could introduce another operator step, such as visual inspection of the sorting decision on a computer terminal, which could in turn slow down the operator and the overall machine throughput.

Disclosed embodiments include automated voice feedback of the systems final sorting decision to the operator in a recognizable audible form. This enables the operator to stay in continuous motion thereby increasing system productivity and accuracy.

FIG. 1 depicts a block diagram of a data processing system 100 in which an embodiment can be implemented, for example, as a mail processing system including voice recognition, configured to perform processes as described herein. The data processing system 100 includes a processor 102 connected to a level two cache/bridge 104, which is connected in turn to a local system bus 106. The local system bus 106 may be, for example, a peripheral component interconnect (PCI) architecture bus. Also connected to the local system bus 106 in the depicted example are a main memory 108 and a graphics adapter 110. The graphics adapter 110 may be connected to a display 111.

Other peripherals, such as a local area network (LAN)/Wide Area Network/Wireless (e.g. WiFi) adapter 112, may also be connected to the local system bus 106. An expansion bus interface 114 connects the local system bus 106 to an input/output (I/O) bus 116. The I/O bus 116 is connected to a keyboard/mouse adapter 118, a disk controller 120, and an I/O adapter 122. The disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. The I/O adapter 122 can be connected to any number of input/output devices, including in particular a mail processing equipment 132 that is capable of performing other mail processing functions, including transporting, sorting, scanning, imaging, and other processes that may be useful for processing parcels, letters, packages, flats, and other mail pieces, all referred to as "mail items" herein, whether processed by postal services or private courier or delivery services.

Also connected to the I/O bus 116 in the example shown is an audio adapter 124, to which sound devices 128 are connected, including in particular an audio input such as a microphone for voice recognition processes and an audio output such as a speaker or headset connection for audio feedback to an operator. The keyboard/mouse, adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. In some embodiments, multiple data processing systems may be connected and configured to cooperatively perform the processing described herein. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

The LAN/WAN/Wireless adapter 112 can be connected to a network 130 (not a part of data processing system 100), which can be any public or private data processing system network or combination of networks, as known to those of skill in the art, including the Internet. The data processing system 100 can communicate over the network 130 with a server system 140, which is also not part of the data processing system 100, but can be implemented, for example, as a separate data processing system 100.

As described above, disclosed embodiments provide automated voice feedback of the system's final sorting decision to the operator in a recognizable audible form.

FIG. 2 illustrates an example of a process in accordance with disclosed embodiments. For example, assume the operator is processing a mail item 230, such as by feeding it into a sorter. The operator picks up the mail item at 202, which can include orienting the mail item. Of course, in other embodiments, the operator need not literally pick up the mail item, but may merely observe it as it is being moved past him on a conveyor or otherwise. The operator validates the mail item at 204, as described in more detail below. After validation, the operator places the mail item to be fed to the sorter at 206. The mail item is then sorted in a conventional manner at 208.

Disclosed embodiments provide an efficient and reliable way to perform the validation 204. To perform the validation, the operator first reads the destination address label of "Arlington, Texas 76011" at 212, in a first "see" step. In this example, the operator has been trained to speak the last 3 digits of the destination ZIP code for incoming local bound mail items; in such a case, the system can have already been programmed to know that all packages are destined for the "76" delivery area, and so the operator need not read the first two digits of the destination ZIP code. In other embodiments, other portions of the ZIP code or other package indicia can be pre-programmed to the system, and other portions can be read by the operator eluding the entire ZIP code or indicia).

In this example, the operator would speak "zero one one" at 214, while the package is still in motion or being moved by the operator; this is a second "speak" step. The spoken data is received by the system as a voice input at an audio input, such as by a hard-mounted microphone, by a wired or wireless microphone worn by the operator, or otherwise.

The system performs a voice recognition process at 216, using techniques known to those of skill in the art, to recognize the spoken "011" voice input, and thereby produces spoken data. The spoken data represents a recreation of the alphanumeric form of the voice input.

The system then analyzes the recognized spoken data at 218. As part of this process, the system can combine the spoken data with other decision data, such as the pre-programmed portions of the ZIP code or other indicia, to form a final system result. As part of this step, the system result can be "decoded" to return the destination city, such as by performing a reverse lookup on "011" in the "76" delivery area. In other cases, this could also be a state or other sorting information depending upon the exact sorting application associated with that ZIP code. The text "Arlington Texas", in this example, would be formed using a reverse address lookup engine that indexes into a national city/state database, commercial or postal, and correlates the text-form destination with the numeric ZIP code or other indicia and translated to voice phonemes using a Text to Speech (ITS) engine, again using techniques known to those in the art. This lookup processes produces feedback information, such as the text-form destination city and state or otherwise, that functions as the feedback response to the operator.

The system audibly sounds the text-form destination or other feedback information to the operator at 222, in a third "hear" step, to provide audio feedback and validation to the operator. The system can do so using a speaker system, by a wired or wireless headphone worn by the user, or otherwise.

This system-generated voice feedback allows the operator to hear the audible validation of the destination sorting address while the visual of the destination address is still available. For example, in most cases, both the ZIP code (or other addressing code) and the corresponding destination ("Arlington Texas") are printed on the item, so the operator can immediately verify if the voice feedback matches the printed destination. Such a system also allows the operator to maintain an uninterrupted sorting process, by repeating a process of picking up an item, speaking the destination sorting code printed on the item, hearing the corresponding system-generated validation, and placing item on a conveyor or other transport. Such a sorting process can all be done in one movement from left to right (or right to left) as a continuous process.

If the operator receives a negative validation, for example if the system-generated voice feedback does not match the item's address information, he can simply not place the item on the system pickoff area. In some embodiments, the operator can then use a voicing command to inform the system of the error (speaking "NO" for example) and re-speak the voice sorting command.

Various embodiments can provide even more reliability in effectively recognizing the spoken address information or commands by using a limited dictionary of recognized words. In various embodiments, the dictionary need only include expected input, including numbers and pre-selected voice commands. In this way, any unexpected or unusual voice input, for example if the operator speaks to a coworker, can be ignored by the system.

FIG. 3 depicts a flowchart of a process in accordance with disclosed embodiments. This process can be performed, for example, by a mail processing system as described herein.

The system transports a mail item (step 305).

The system receives a voice input corresponding to the mail item (step 310). As described herein, the voice input can be a portion of or all of an alphanumeric indicia corresponding to the mail item, including destination information printed on or attached to the mail item. In particular, in some embodiments, the voice input can be an operator's reading of all or part of a destination delivery code such as a ZIP code.

The system performs a voice recognition process on the voice input to reproduce the alphanumeric form of the voice input (step 315), referred to herein as the "spoken data."

The system produces a system result corresponding to the spoken data (step 320). This can be performed by combining the spoken data with other decision data, such as a pre-programmed portion of the alphanumeric indicia or other data indicating the destination, sender, or other information. In other cases, the system result can be the same as the spoken data, for example if the entire ZIP code is read by the operator.

The system analyzes the system result to produce feedback information (step 325). The step can include performing a database lookup based on the system result. In particular embodiments, the system result is a destination code such as a 5, 9, or 11-digit code such as a ZIP code, and the feedback information is the text-form city or state corresponding to the destination code.

The system audibly sounds the feedback information to the operator (step 330). This can be performed using standard text-to-speech techniques.

The system can receive and respond to a voice command from an operator at the audio input (step 335). This optional step can be, for example, a spoken indication that the feedback information was incorrect, that there is some other problem with the mail item or the indicia, or otherwise. In some cases, the system can respond to the voice command by repeating the process at step 310, or can perform other processing of the mail item according to the voice command.

The system can then process the mail item according to the system result (step 340). Processing, in this case, can include sorting, transporting, delivering, or performing other processing on the mail item.

In particular, in various embodiments, the feedback information is not the same as all or a portion of the voice input or spoken data. That is, a particular advantage of some embodiments is that the audible feedback differs from but corresponds to what the operator has spoken into the system, which acts as an inherent "sanity check" on the input and feedback, where simply repeating back all or part of what the operator has spoken would be less useful in detecting errors.

Various embodiments disclosed herein include methods, apparatuses, and processes to enhance the accuracy of speech-directed and/or OCR-based mail item sorting applications using operator automated speech feedback for sorting validation. Disclosed embodiments provide distinct technical advantages to mail-processing systems in several ways. For example, disclosed techniques increase system productivity using a "See-Speak-Hear-Sort" application and process. They decrease system error rate using such applications and processes. Disclosed embodiments are particularly advantageous in speech-only sorting applications (i.e., with no OCR processes) because of the increased accuracy provided by the audible feedback validation.

Various disclosed embodiments can incorporate a reverse-lookup engine for system result to text-type (ASCII or XML) resolution. Various embodiments can use "off the shelf" Text To Speech (ITS) engines or other embedded TTS with existing computer operator systems. The TTS can be optimized for clarity and speed for audible feedback, so that there is little or no delay for the audible response to the operator.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD- ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a mail processing system, the method comprising:
   receiving a voice input, from an operator, of only a portion of a numeric destination delivery code corresponding to a mail item;
   performing a voice recognition process on the voice input to produce spoken data;
   producing a system result corresponding to the spoken data;
   analyzing the system result to produce feedback information; and
   audibly sounding the feedback information to the operator, wherein the feedback information is a text-form destination that corresponds to the numeric destination delivery code.

2. The method of claim 1, wherein the mail processing system also receives and responds to a voice command.

3. The method of claim 1, wherein the system result is produced by combining the spoken data with decision data.

4. The method of claim 1, wherein the feedback information is a city or state corresponding to the destination delivery code.

5. The method of claim 1, wherein analyzing the system result includes performing a database lookup on the system result to produce the feedback information.

6. The method of claim 1, wherein the mail processing system also receives a voice command from a user and responds by repeating the voice recognition process for the mail item.

7. A mail processing system, comprising:
   at least one processor;
   a microphone; and
   a storage device storing a database, the mail processing system configured to:
   receive a voice input at the microphone from an operator, the voice input of only a portion of a numeric destination delivery code corresponding to a mail item;
   perform a voice recognition process on the voice input to produce spoken data;
   produce a system result corresponding to the spoken data;
   analyze the system result to produce feedback information, including performing a lookup in the database to identify the feedback information; and
   audibly sounding the feedback information to the operator, wherein the feedback information is a text-form destination that corresponds to the numeric destination delivery code.

8. The mail processing system of claim 7, wherein the mail processing system is also configured to receive and respond to a voice command.

9. The mail processing system of claim 7, wherein the system result is produced by combining the spoken data with decision data.

10. The mail processing system of claim 7, wherein the feedback information is a city or state corresponding to the destination delivery code.

11. The mail processing system of claim 7, wherein analyzing the system result includes performing a database lookup on the system result to produce the feedback information.

12. The mail processing system of claim 7, wherein the mail processing system also receives a voice command from a user and responds by repeating the voice recognition process for the mail item.

13. A non-transitory computer readable medium having program instructions stored thereon executable by one or more processors to:
   receive a voice input from an operator, the voice input of only a portion of a numeric destination delivery code corresponding to a mail item;
   perform a voice recognition process on the voice input to produce spoken data;
   produce a system result corresponding to the spoken data;
   analyze the system result to produce feedback information, including performing a lookup in the database to identify the feedback information, wherein the feedback information does not include all or part of the spoken data; and
   audibly sounding the feedback information to the operator, wherein the feedback information is a text-form destination that corresponds to the numeric destination delivery code.

14. The computer-readable medium of claim 13, also storing instructions to receive and respond to a voice command.

15. The mail processing system of claim 13, wherein the system result is produced by combining the spoken data with decision data.

16. The mail processing system of claim 13, wherein the feedback information is a city or state corresponding to the destination delivery code.

17. The mail processing system of claim 13, wherein analyzing the system result includes performing a database lookup on the system result to produce the feedback information.

18. The method of claim 1, wherein the portion of the destination delivery code is the last three digits of the zip code.

19. The mail processing system of claim 7, wherein the portion of the destination delivery code is the last three digits of the zip code.

20. The mail processing system of claim 13, wherein the portion of the destination delivery code is the last three digits of the zip code.

* * * * *